United States Patent
Waki et al.

(10) Patent No.: US 10,388,955 B2
(45) Date of Patent: Aug. 20, 2019

(54) NEGATIVE ELECTRODE FOR LITHIUM ION SECONDARY BATTERY AND LITHIUM ION SECONDARY BATTERY

(71) Applicant: Automotive Energy Supply Corporation, Zama-shi, Kanagawa (JP)

(72) Inventors: Ippei Waki, Zama (JP); Yuji Tanjo, Zama (JP)

(73) Assignee: Envision AESC Japan Ltd., Kanagawa (JP)

( * ) Notice: Subject to any disclaimer, the term of this patent is extended or adjusted under 35 U.S.C. 154(b) by 0 days.

(21) Appl. No.: 15/626,507

(22) Filed: Jun. 19, 2017

(65) Prior Publication Data

US 2018/0006305 A1 Jan. 4, 2018

(30) Foreign Application Priority Data

Jun. 29, 2016 (JP) .................................. 2016-128899

(51) Int. Cl.
| | | |
|---|---|---|
| *H01M 4/583* | (2010.01) | |
| *C01B 32/20* | (2017.01) | |
| *H01M 4/62* | (2006.01) | |
| *H01M 10/0525* | (2010.01) | |
| *H01M 4/133* | (2010.01) | |
| *H01M 4/587* | (2010.01) | |
| *H01M 4/02* | (2006.01) | |

(52) U.S. Cl.
CPC ............ *H01M 4/583* (2013.01); *C01B 32/20* (2017.08); *H01M 4/133* (2013.01); *H01M 4/587* (2013.01); *H01M 4/621* (2013.01); *H01M 4/622* (2013.01); *H01M 4/625* (2013.01); *H01M 10/0525* (2013.01); *H01M 2004/027* (2013.01)

(58) Field of Classification Search
CPC .......... H01M 2004/027; H01M 4/583; H01M 4/621; H01M 4/133; H01M 4/622; H01M 4/625; C01B 32/20
USPC ................................... 429/231.8, 209, 218.1
See application file for complete search history.

(56) References Cited

U.S. PATENT DOCUMENTS 8,329,136 B2 * 12/2012 Umeno ............. C04B 35/62839
    29/623.1
2012/0052393 A1 * 3/2012 Kameda ................. H01M 4/133
    429/231.8

(Continued)

FOREIGN PATENT DOCUMENTS

| JP | 2001-229914 A | 8/2001 |
| JP | 2012-074297 A | 4/2012 |
| JP | 2015-130324 A | 7/2015 |

OTHER PUBLICATIONS

Machine translation of JP 2015-130324 (no date).*

(Continued)

*Primary Examiner* — Amanda C. Walke
(74) *Attorney, Agent, or Firm* — Morgan, Lewis & Bockius LLP

(57) ABSTRACT

A negative electrode for a lithium ion secondary battery includes: a negative electrode current collector (11); and a negative electrode active material for a lithium ion secondary battery, which is disposed on the negative electrode current collector and contains a carbon material and an aqueous binder. The carbon material is a graphite particle having a covering layer containing amorphous carbon by 5 wt % or less relative to a total weight of the carbon material.

21 Claims, 3 Drawing Sheets

(56) References Cited

U.S. PATENT DOCUMENTS

| | | | |
|---|---|---|---|
| 2012/0196193 A1 | 8/2012 | Sotowa et al. | |
| 2014/0170501 A1 | 6/2014 | Takahata | |
| 2015/0104711 A1 | 4/2015 | Waki et al. | |
| 2015/0243989 A1 | 8/2015 | Yamada et al. | |
| 2017/0005361 A1 | 1/2017 | Kamezaki et al. | |
| 2017/0338456 A1* | 11/2017 | Suguro | H01M 2/1646 |
| 2018/0006304 A1* | 1/2018 | Waki | H01M 4/583 |
| 2018/0241075 A1* | 8/2018 | Ohara | H01M 2/16 |

OTHER PUBLICATIONS

Machine translation of JP 2015-074297 (no date).*
Extended European Search Report issued in corresponding European Patent Application No. 17177115.7 dated Jul. 31, 2017.

* cited by examiner

NEGATIVE ELECTRODE FOR LITHIUM ION SECONDARY BATTERY AND LITHIUM ION SECONDARY BATTERY

CROSS-REFERENCE TO RELATED APPLICATION

This application claims priority from Japanese Patent Application No. 2016-128899 filed with the Japan Patent Office on Jun. 29, 2016, the entire content of which is hereby incorporated by reference.

BACKGROUND

1. Technical Field

The present disclosure relates to a negative electrode used for a nonaqueous electrolyte battery, particularly a lithium ion secondary battery.

2. Description of the Related Art

Nonaqueous electrolyte batteries have been practically used as batteries for vehicles including hybrid vehicles, electric vehicles, and the like. Examples of the batteries used for the on-vehicle power source include lithium ion secondary batteries. Lithium ion secondary batteries have been required to have various characteristics including the output characteristic, the energy density, the capacity, the lifetime, and the high-temperature stability. In particular, in order to improve the input/output characteristic of the battery, various improvements for the electrode have been attempted.

For example, JP-A-2001-229914 has suggested the carbon negative electrode for a secondary battery, which has the high capacity and in which the gas generation in the charging is suppressed, and the secondary battery including this negative electrode. JP-A-2001-229914 is featured in that the active material for the negative electrode contains graphite covered with amorphous carbon as below. In the graphite covered with amorphous carbon, the weight decrement in the first stage based on a predetermined measurement method obtained by the thermogravimetry (TG) is 3 to 20% of the weight before the temperature increase.

SUMMARY

A negative electrode for a lithium ion secondary battery includes: a negative electrode current collector; and a negative electrode active material for a lithium ion secondary battery, which is disposed on the negative electrode current collector and contains a carbon material and an aqueous binder. The carbon material is a graphite particle having a covering layer containing amorphous carbon by 5 wt % or less relative to a total weight of the carbon material.

DESCRIPTION OF THE EMBODIMENTS

Figure 1:
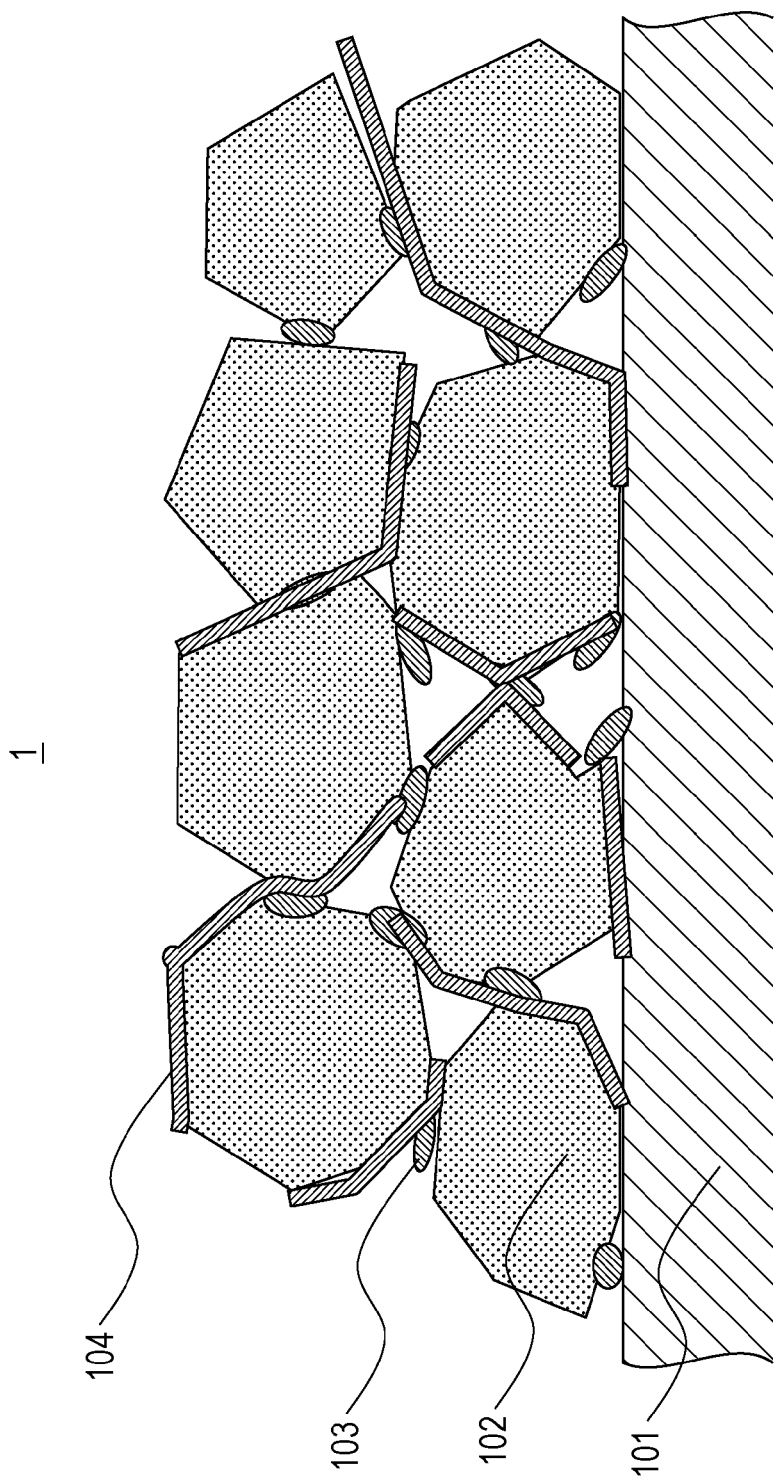
FIG. 1 is a schematic cross-sectional view illustrating a negative electrode for a lithium ion secondary battery according to one embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the secondary battery according to JP-A-2001-229914 in which the graphite covered with amorphous carbon is used as the carbon material in the negative electrode active material, the gas generation in the charging can be suppressed. However, covering graphite with much amorphous carbon makes it easier to separate the negative electrode active material layer from the current collector such as a metal foil on which the negative electrode active material layer has been formed.

In view of the above, it is an object of the present disclosure to improve the durability of the negative electrode for a lithium ion secondary battery by optimizing the ratio between amorphous carbon and graphite in the carbon material used for the negative electrode active material.

A negative electrode for a lithium ion secondary battery according to the present disclosure includes: a negative electrode current collector; and a negative electrode active material for a lithium ion secondary battery, which is disposed on the negative electrode current collector and contains a carbon material and an aqueous binder. The carbon material is a graphite particle having a covering layer containing amorphous carbon by 5 wt % or less relative to a total weight of the carbon material.

The negative electrode for a lithium ion secondary battery according to an embodiment of the present disclosure has the excellent durability because of having the high adhesive power between the negative electrode active material layer and the metal foil. The lithium ion secondary battery including this negative electrode for a lithium ion secondary battery has the excellent durability and the long lifetime.

An embodiment of the present disclosure will be described below. In the present embodiment, a lithium ion secondary battery includes a power generating element in a package. The power generating element includes a positive electrode, a negative electrode, a separator, and an electrolyte solution. Here, the negative electrode for a lithium ion secondary battery (hereinafter also referred to as "negative electrode" simply) includes a negative electrode current collector, and a negative electrode active material layer disposed on the negative electrode current collector. Specifically, the negative electrode is a battery member with a shape like a thin plate or a sheet and includes the negative electrode current collector and the negative electrode active material layer. The negative electrode active material layer is formed by applying on the negative electrode current collector, a mixture containing a negative electrode active material, a binder, and if necessary, a conductive agent.

Here, the negative electrode active material preferably contains a carbon material. In particular, the carbon material is preferably a graphite particle having a covering layer of amorphous carbon of 5 wt % or less relative to the total weight of the carbon material. Here, "the graphite particle having the covering layer of amorphous carbon" refers to the graphite particle having its surface covered with amorphous carbon. "The graphite particle having the covering layer of amorphous carbon" only needs to have a part of the surface of the graphite particle covered with amorphous carbon, and it is not necessary that the entire surface of the graphite particle is covered with amorphous carbon. Moreover, "the covering layer" does not necessarily mean the layer having the uniform thickness. In the present embodiment, it is important that the graphite particle is covered with amorphous carbon of 5 wt % or less relative to the total weight of the carbon material.

When graphite (graphite particles) used in each embodiment is contained in the negative electrode active material layer, the output of the battery can be improved even if the state of charge (SOC) of the battery is low, and this is advantageous. Graphite is the hexagonal crystal carbon material having the hexagonal-plate-like crystal structure, and is also referred to as black lead, graphite, or the like. The shape of the graphite is preferably like a particle.

As the graphite (graphite particles), there are natural graphite (natural graphite particles) and artificial graphite (artificial graphite particles). Natural graphite is inexpensive and can be obtained in large quantity, and moreover has the stable structure and the excellent durability. Since the artificial graphite is the artificially produced graphite and has high purity (the impurities such as allotropes are hardly contained), the artificial graphite has the low electric resistance. Either the natural graphite or the artificial graphite can be used suitably as the carbon material in the present embodiment. In particular, the natural graphite with a covering layer of amorphous carbon or the artificial graphite with a covering layer of amorphous carbon is preferably used.

Note that amorphous carbon used in each embodiment may partially have a structure similar to that of graphite. Amorphous carbon is the carbon material which includes microcrystals forming the network randomly and is amorphous as a whole. Examples of the amorphous carbon include carbon black, coke, activated carbon, carbon fiber, hard carbon, soft carbon, and mesoporous carbon. The graphite particle with a covering layer of amorphous carbon used in the embodiment may be either the natural graphite particle with a covering layer of amorphous carbon or the artificial graphite with a covering layer of amorphous carbon. When these are used as the carbon material of the negative electrode active material, the decomposition of the electrolyte solution is suppressed and the negative electrode can have the higher durability. In addition, the gas generation in charging the battery is suppressed. For this reason, the durability of the battery itself is improved.

Here, in the case of using artificial graphite as the graphite, the interlayer distance d value ($d_{002}$) is preferably 0.337 nm or more. The structure of the crystal of the artificial graphite is generally thinner than that of natural graphite. In the case of using the negative electrode active material for a lithium ion secondary battery containing the artificial graphite, it is necessary that the artificial graphite has the interlayer distance at which the intercalation of lithium ions is possible. The interlayer distance at which the intercalation/deintercalation of lithium ions is possible can be estimated based on the d value ($d_{002}$). If the d value is 0.337 nm or more, the intercalation/deintercalation of lithium ions is possible.

The reason why the graphite particle with the covering layer containing amorphous carbon by 5 wt % or less relative to the total weight of the carbon material is used as the carbon material is not because of the particular theory but can be considered as below. FIG. 1 is a schematic view of the negative electrode in which the negative electrode active material layer is disposed on the surface of the negative electrode current collector. As illustrated in FIG. 1, the negative electrode 1 for a lithium ion secondary battery includes a negative electrode current collector 101, a negative electrode active material 102, a conductive agent 103, and a binder 104. In the negative electrode 1 for a lithium ion secondary battery, a mixture of the negative electrode active material 102, the conductive agent 103, and the binder 104 is stacked on a surface of the negative electrode current collector 101, and this forms the negative electrode active material layer. In FIG. 1, the binder 104 binds the particles of the negative electrode active material 102 as well as the negative electrode active material layer and the negative electrode current collector 101. Then, the conductive agent 103 exists to fill the space between the particles of the negative electrode active material 102 to promote the transfer of the electrons. It is particularly preferable that the carbon material is used as the negative electrode active material 102 in the negative electrode active material layer, carbon black is used as the conductive agent 103, and an aqueous binder is used as the binder 104. In the negative electrode active material 102, the particles having almost the same shape and size are in contact with each other adjacently and adhere to each other through the binder 104.

Figure 2B:
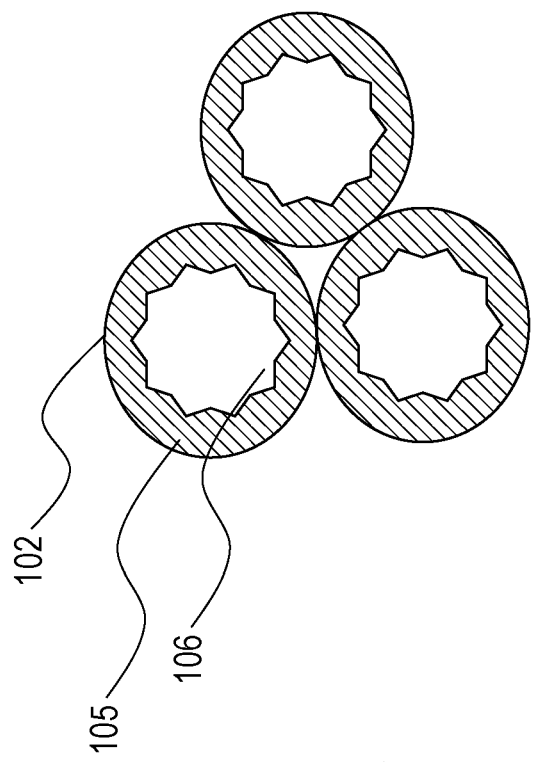
FIGS. 2A and 2B are schematic views illustrating a carbon material of the negative electrode for a lithium ion secondary battery according to one embodiment of the present disclosure.
Figure 2A:
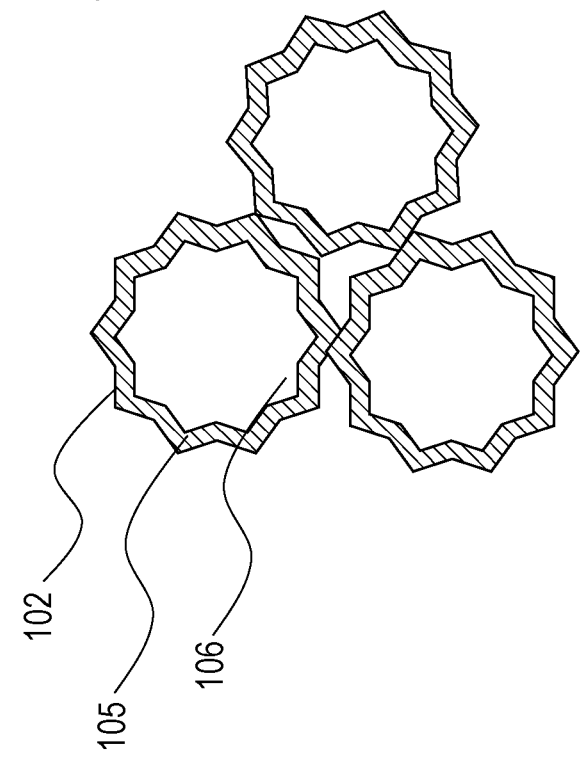

Next, FIG. 2A and FIG. 2B schematically show the cross-section of the negative electrode active material. The following description is the presumption and the effect of the present embodiment is not limited to the effect obtained by the following structure only. The negative electrode active material 102 contains graphite particles 106 with a covering layer containing amorphous carbon 105. The graphite particles 106 have almost the same size but the shape is uneven and irregular. Here, if the graphite particles 106 are provided with the covering layer containing amorphous carbon 105 by 5 wt % or less relative to the total weight of the carbon material, the unevenness on the surface of the graphite particles 106 is not covered up completely. Therefore, the graphite particles 106 still have the uneven shape (FIG. 2A). For this reason, the adjacent carbon materials can be in contact with each other at a plurality of points. However, if the graphite particles 106 are provided with the covering layer containing amorphous carbon 105 by more than 5 wt % relative to the total weight of the carbon material, the unevenness on the surface of the graphite particles 106 is covered up completely. Therefore, most of the graphite particles 106 have the spherical or spheroidal shape (FIG. 2B). In this case, the adjacent carbon materials are in contact with each other at one point only. If the covering with amorphous carbon is too much, the carbon materials are in contact with each other at fewer points, so that the binding of the carbon materials may become weak. On the other hand, if the covering with amorphous carbon is too little, the decomposition of the electrolyte solution or the like may occur on the surface of the negative electrode when the battery is charged. It is difficult to suppress the gas generation because of this. In view of this, the balance of the amount of amorphous carbon for the covering relative to the total weight of the carbon material is examined. As a result, it has been understood that the graphite particles having the covering layer containing amorphous carbon by 5 wt % or less relative to the total weight of the carbon material can suppress the separation of the negative electrode active material layer while suppressing the gas generation in the charging. In this case, the covering layer contains amorphous carbon preferably by 0.5 wt % or more, more preferably by 1 wt % or more, relative to the total weight of the carbon material.

It is particularly preferable that the binder included in the negative electrode active material layer is aqueous binder.

The binder plays the role of binding together the particles of the carbon material as the negative electrode active material, and binding together the negative electrode active material layer and the metal foil. Examples of the preferable aqueous binder include synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin. In particular, using SBR, CMC, and a mixture thereof as the aqueous binder can improve the adhesive power between the carbon materials.

Another example of the binder is polyvinylidene fluoride (PVDF). If PVDF is used as the binder, N-methylpyrrolidone (NMP) can be used as the solvent instead of water. In this case, the gas generation due to the remaining moisture can be suppressed. Other examples of the binder include fluorine resins such as polytetrafluoroethylene (PTFE) and polyvinyl fluoride (PVF), and conductive polymers such as polyanilines, polythiophenes, polyacetylenes, and polypyrroles, in addition to PVDF.

The binder is contained preferably by approximately 4 to 7 wt % relative to the weight of the entire negative electrode active material layer. When the binder is contained in the above range, the binding force of the negative electrode material can be secured and the resistance of the negative electrode can be maintained low.

The negative electrode active material layer may contain a conductive agent if necessary. Examples of the conductive agent include carbon fiber such as carbon nanofiber, carbon black such as acetylene black and Ketjen black, and other carbon materials such as activated carbon, mesoporous carbon, fullerenes, and carbon nanotube. In addition, the negative electrode active material layer may contain an additive generally used for forming the electrode, such as thickener, dispersant, and stabilizer.

In the embodiment, the negative electrode active material layer can be formed as below. First, the carbon material as the negative electrode active material, a binder, and a conductive agent are mixed in an appropriate proportion in a solvent (such as water or N-methylpyrrolidone (hereinafter referred to as "NMP")); thus, slurry is formed. Next, this slurry is applied or rolled on a negative electrode current collector including a metal foil (such as a copper foil). The solvent is evaporated by heating the negative electrode current collector. Thus, the negative electrode active material layer can be formed. On this occasion, preferably, the slurry is disposed so that the weight of the negative electrode active material layer after the evaporation of the solvent is 2.5 to 10 mg/cm$^2$ on each surface of the negative electrode current collector. The weight of the negative electrode active material layer on each surface of the negative electrode current collector can be adjusted by changing the concentration of the slurry, the amount and the thickness of the slurry, the heating time to evaporate the solvent, and the like as appropriate. It is preferable to set the weight of the negative electrode active material layer to be small because the negative electrode will have lower resistance. However, it is very difficult to set the weight of the negative electrode active material layer on one surface to be 2.5 mg/cm$^2$. This is reason why the weight of the negative electrode active material layer is preferably set in the range of 2.5 to 10 mg/cm$^2$ on each surface of the negative electrode current collector.

In the lithium ion secondary battery according to the embodiment, the positive electrode is a battery member with a shape like a thin plate or a sheet. This member has a positive electrode active material layer formed by applying or rolling, and then drying a mixture of a positive electrode active material, a binder, and if necessary, a conductive agent on a positive electrode current collector such as a metal foil. The positive electrode active material layer preferably contains the positive electrode active material containing lithium nickel composite oxide. The lithium nickel composite oxide is transition metal composite oxide containing lithium and nickel, which is represented by the general formula $Li_xNi_yMe_{(1-y)}O_2$ (here, Me is at least one or more kinds of metals selected from the group consisting of Al, Mn, Na, Fe, Co, Cr, Cu, Zn, Ca, K, Mg, and Pb).

The positive electrode that can be used in the embodiment includes the positive electrode where the positive electrode active material layer containing the positive electrode active material is disposed on the positive electrode current collector. Preferably, the positive electrode active material layer of the positive electrode is formed as below. A mixture containing the positive electrode active material, the binder, and the conductive agent added if necessary is applied or rolled on the positive electrode current collector including a metal foil such as an aluminum foil. After that, the drying step is performed and thus, the positive electrode active material layer is obtained. In each embodiment, the positive electrode active material layer preferably contains the positive electrode active material containing lithium nickel composite oxide. The lithium nickel composite oxide is the transition metal composite oxide containing lithium and nickel, which is represented by the general formula $Li_xNi_yMe_{(1-y)}O_2$ (here, Me is one or more kinds of metals selected from the group consisting of Al, Mn, Na, Fe, Co, Cr, Cu, Zn, Ca, K, Mg, and Pb).

The positive electrode active material layer may further contain the positive electrode active material containing lithium manganese composite oxide. Examples of the lithium manganese composite oxide include lithium manganate ($LiMnO_2$) with a zig-zag-layered structure and spinel type lithium manganate ($LiMn_2O_4$). By using the lithium manganese composite oxide additionally, the positive electrode can be fabricated at lower cost. It is particularly preferable to use the spinel type lithium manganate ($LiMn_2O_4$) because of having the excellent stability of the crystal structure in the overcharged state.

It is particularly preferable that the positive electrode active material layer contains the positive electrode active material containing lithium nickel manganese cobalt composite oxide with a layered crystal structure represented by the general formula $Li_xNi_yCo_zMn_{(1-y-z)}O_2$. Here, x in the general formula is a number satisfying the relation of $1 \leq x \leq 1.2$. In addition, y and z are positive numbers satisfying $y+z<1$, and y is 0.5 or less. As more manganese is contained, it becomes more difficult to form the composite oxide with a single phase. Therefore, desirably, the relation of $1-y-z \leq 0.4$ is satisfied. Moreover, as more cobalt is contained, the cost will increase and moreover, the capacity will decrease. Therefore, desirably, the relations of $z<y$ and $z<1-y-z$ are satisfied. In order to obtain the high-capacity battery, it is desirable that the relations of $y>1-y-z$ and $y>z$ and are satisfied.

Examples of the conductive agent used if necessary for the positive electrode active material layer include carbon fiber such as carbon nanofiber, carbon black such as acetylene black and Ketjen black, and other carbon materials such as activated carbon, graphite, mesoporous carbon, fullerenes, and carbon nanotube. In addition, the positive electrode active material layer may appropriately contain an additive generally used for forming the electrode, such as thickener, dispersant, and stabilizer.

Examples of the binder used for the positive electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

In the lithium ion secondary battery according to the embodiment, the separator is a film-shaped battery member. This member is to secure the conductivity of lithium ions between the negative electrode and the positive electrode by separating the positive electrode and the negative electrode from each other. The separator used in the embodiment includes the olefin resin layer. The olefin resin layer is a layer containing polyolefin obtained by polymerizing or co-polymerizing α-olefin such as ethylene, propylene, butene, pentene, or hexene. In the embodiment, the olefin resin layer is preferably a layer with a structure having pores closed when the battery temperature has increased, i.e., a layer containing the porous or microporous polyolefin. When the olefin resin layer has such a structure, even if the battery temperature should increase, the separator is closed (shutdown) to block the ion flow. To achieve the shutdown effect, it is particularly preferable to use the porous polyethylene film. The separator may have a heat-resistant microparticle layer. In this case, the heat-resistant microparticle layer is provided to prevent the stop of the battery function when the battery generates heat. This heat-resistant microparticle layer contains stable and heat-resistant inorganic microparticles that can resist temperatures of 150° C. or more and do not easily react electrochemically. Examples of such an inorganic microparticle include inorganic oxide such as silica, alumina (α-alumina, β-alumina, and θ-alumina), iron oxide, titanium oxide, barium titanate, and zirconium oxide, and minerals such as boehmite, zeolite, apatite, kaolin, spinel, mica, and mullite. The ceramic separator including the heat-resistant layer can also be used.

In the lithium ion secondary battery according to the embodiment, the electrolyte solution is a solution with the electric conductivity that is obtained by dissolving the ionic substance in the solvent. In the embodiment, in particular, a nonaqueous electrolyte solution is used. The power generating element including the positive electrode, the negative electrode, the separator, and the electrolyte solution constitutes one unit of the main components of the battery. The power generating element usually includes the stack including the positive electrode and the negative electrode which are stacked on each other with the separator interposed therebetween. In the lithium ion secondary battery according to the present embodiment, this stack is impregnated with the electrolyte solution.

A preferable example of the electrolyte solution used in the embodiment according to the present disclosure is the nonaqueous electrolyte solution, and may be the mixture containing: a linear carbonate such as dimethyl carbonate (hereinafter referred to as "DMC"), diethyl carbonate (hereinafter referred to as "DEC"), ethylmethyl carbonate (hereinafter referred to as "EMC"), di-n-propyl carbonate, di-i-propyl carbonate, di-n-butyl carbonate, di-i-butyl carbonate, or di-t-butyl carbonate; and a cyclic carbonate such as propylene carbonate (PC) or ethylene carbonate (hereinafter referred to as "EC"). The electrolyte solution is obtained by dissolving a lithium salt such as lithium hexafluorophosphate ($LiPF_6$), lithium tetrafluoroborate ($LiBF_4$), or lithium perchlorate ($LiClO_4$) in such a carbonate mixture.

The electrolyte solution preferably contains PC and EC corresponding to the cyclic carbonate and DMC and EMC corresponding to the linear carbonate. In particular, PC is the solvent with the low coagulating point, and is useful for improving the output when the battery has the low temperature. However, it is known that the compatibility of PC to the graphite used as the negative electrode active material is a little low. EC is the solvent with the high polarity, i.e., the high dielectric constant. EC is useful as the component of the electrolyte solution for a lithium ion secondary battery. However, EC has a high melting point (coagulating point) and is solid at room temperature. Therefore, even if the mixed solvent containing EC is prepared, the coagulation and the deposition may occur at low temperature. DMC is the solvent with the low viscosity and the high diffusion coefficient. However, DMC has the high melting point (coagulating point). Therefore, it may happen that the electrolyte solution is coagulated at low temperature. Like DMC, EMC is the solvent with the low viscosity and the high diffusion coefficient. In this manner, the components of the electrolyte solution have the different characteristics. In order to improve the output when the battery has the low temperature, it is important to consider the balance between these components. By adjusting the ratio between the cyclic carbonate and the linear carbonate to be contained, the electrolyte solution having the low viscosity at room temperature and maintaining its property even at the low temperature can be obtained.

The electrolyte solution may contain the cyclic carbonate compound as the additive. Examples of the cyclic carbonate used as the additive include vinylene carbonate (VC). A cyclic carbonate compound with a halogen as the additive may be used. These cyclic carbonates are the compounds that form a protective film for the positive electrode and the negative electrode in the process of charging and discharging the battery. In particular, the cyclic carbonates can prevent the sulfur-containing compound such as the disulfonic acid compound or the disulfonic acid ester compound from attacking the positive electrode active material containing the lithium nickel composite oxide. Examples of the cyclic carbonate compounds with a halogen include fluoroethylene carbonate (FEC), difluoroethylene carbonate, trifluoroethylene carbonate, chloroethylene carbonate, dichloroethylene carbonate, and trichloroethylene carbonate. Fluoroethylene carbonate corresponding to the cyclic carbonate compound with a halogen and an unsaturated bond is particularly preferably used.

The electrolyte solution may further contain a disulfonic acid compound as the additive. The disulfonic acid compound is a compound having two sulfo groups in one molecule. The disulfonic acid compound incorporates a disulfonate compound corresponding to a salt formed by the reaction between the sulfo group and the metal ion, and a disulfonic acid ester compound having the ester bond including the sulfo group. One or two of the sulfo groups of the disulfonic acid compound may react with the metal ion to form the salt or may be in the anion state. Examples of the disulfonic acid compound include methanedisulfonic acid, 1,2-ethanedisulfonic acid, 1,3-propanedisulfonic acid, 1,4-butanedisulfonic acid, benzenedisulfonic acid, naphthalenedisulfonic acid, biphenyldisulfonic acid, salts thereof (such as lithium methanedisulfonate and lithium 1,3-ethanedisulfonate), and anions thereof (such as methanedisulfonic acid anion and 1,3-ethanedisulfonic acid anion). Other examples of the disulfonic acid compound include a disulfonic acid ester compound. Among these disulfonic acid esters, linear disulfonic acid esters of alkyl diester and aryl diester, such as methanedisulfonic acid, 1,2-ethanedisulfonic acid, 1,3-propanedisulfonic acid, 1,4-butanedisulfonic acid, benzenedisulfonic acid, naphthalenedisulfonic acid, and biphenyldisulfonic acid, and cyclic disulfonic acid esters such as methylene methanedisulfonate, ethylene methanedisulfonate, and propylene methanedisulfonate are preferably used. Methylene methanedisulfonate (hereinafter referred to as "MMDS") is particularly preferable.

The package of the lithium ion secondary battery according to the present embodiment includes the power generating element. Preferably, the power generating element is sealed in the package. The sealing means that the power generating element is covered with the package material so that the power generating element is not exposed to the external air. That is to say, the package has a bag-like shape that can seal the power generating element inside. As the package, an aluminum laminate can be used.

Figure 3:
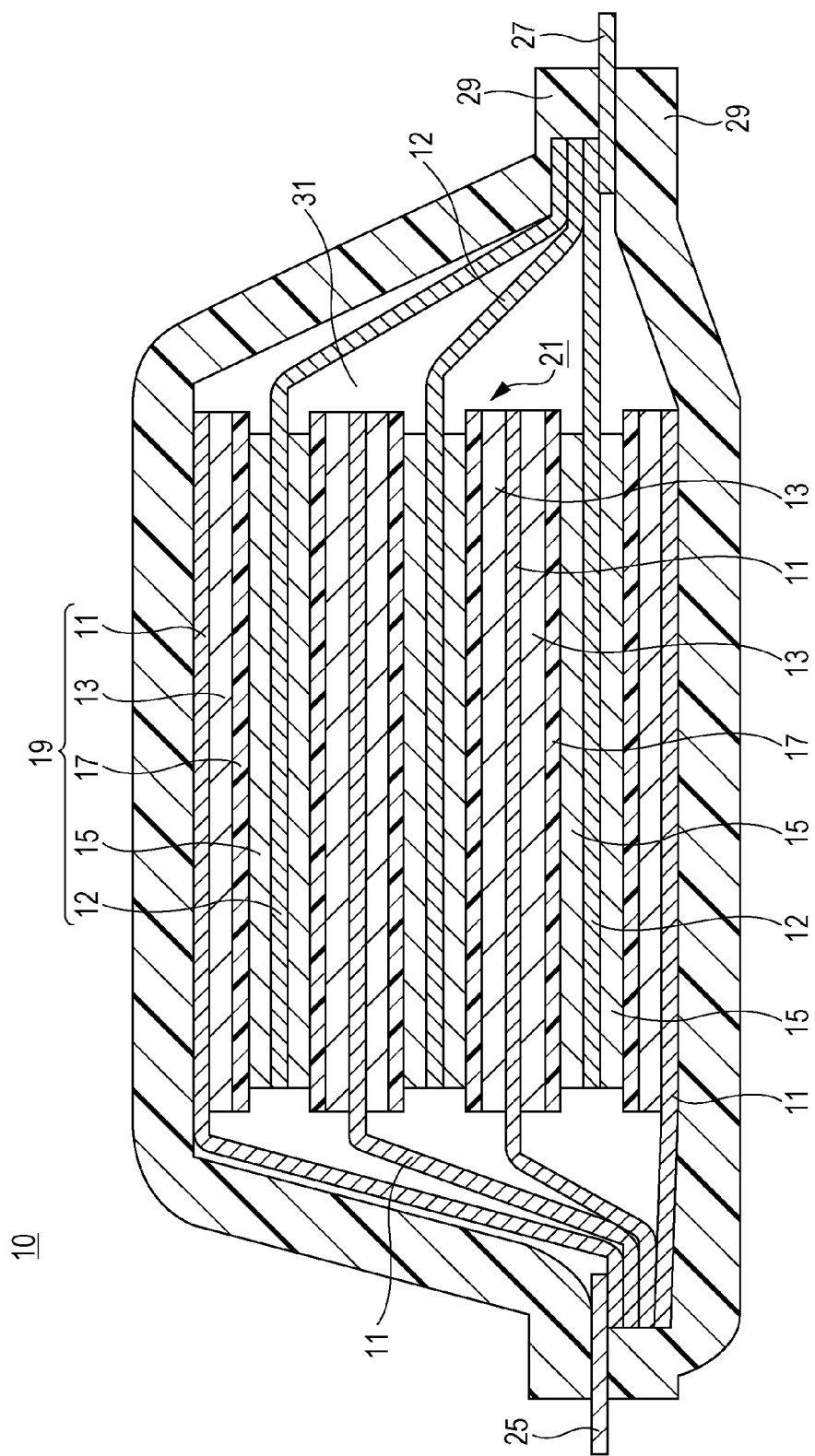
FIG. 3 is a schematic cross-sectional view illustrating a lithium ion secondary battery according to one embodiment of the present disclosure.

Here, a structure example of the lithium ion secondary battery according to the present embodiment is illustrated in FIG. 3. As illustrated in FIG. 3, a lithium ion secondary battery 10 includes, as main components, negative electrode current collectors 11, negative electrode active material layers 13, separators 17, positive electrode current collectors 12, and positive electrode active material layers 15. In FIG. 1, the negative electrode active material layer 13 is disposed on each of opposite surfaces of the negative electrode current collectors 11. On each of the opposite surfaces of the positive electrode current collectors 12, the positive electrode active material layer 15 is disposed. Alternatively, the active material layer can be disposed on only one surface of each current collector. The negative electrode current collector 11, the positive electrode current collector 12, the negative electrode active material layer 13, the positive electrode active material layer 15, and the separator 17 constitute one battery unit, i.e., the power generating element (a unit cell 19 in the drawing). A plurality of such unit cells 19 is stacked with the separator 17 interposed therebetween. Extension portions extending from the negative electrode current collectors 11 are collected and bonded onto a negative electrode lead 25. Extension portions extending from the positive electrode current collectors 12 are collected and bonded onto a positive electrode lead 27. The positive electrode lead is preferably an aluminum plate and the negative electrode lead is preferably a copper plate. These leads may be partly coated with another metal (such as nickel, tin, or solder) or a polymer material. The positive electrode lead and the negative electrode lead are welded to the positive electrode and the negative electrode, respectively. The battery including the stacked unit cells is covered with a package 29 so that the welded negative electrode lead 25 and positive electrode lead 27 are led out of the battery. An electrolyte solution 31 is poured into the package 29. The package 29 has a shape obtained by heat-sealing the periphery of the two stacks.

EXAMPLES

<Preparation of Negative Electrode Active Material>

Pitch pulverized to have a mean particle diameter of 60 μm and spherical graphite with a mean particle diameter of 16 μm were mixed in a dry process with a weight ratio of 8:92. This mixture was calcined at 1000° C. for 12 hours in a nitrogen atmosphere. This calcined mixture was pulverized and sieved through a 400-mesh sieve; thus, a carbon material with a mean particle diameter of 17 μm (graphite having a covering layer of amorphous carbon) was obtained (Example 1).

A carbon material was obtained by the same method as that of Example 1 except that the mixing ratio between the pitch and the spherical graphite was set to 6:94 (Example 2).

A carbon material was obtained by the same method as that of Example 1 except that the mixing ratio between the pitch and the spherical graphite was set to 5:95 (Example 3).

A carbon material was obtained by the same method as that of Example 1 except that the mixing ratio between the pitch and the spherical graphite was set to 3:97 (Example 4).

A carbon material was obtained by the same method as that of Example 1 except that the mixing ratio between the pitch and the spherical graphite was set to 2:98 (Example 5).

A carbon material was obtained by the same method as that of Example 1 except that the mixing ratio between the pitch and the spherical graphite was set to 10:90 (Comparative Example 1).

A carbon material was obtained by the same method as that of Example 1 except that the mixing ratio between the pitch and the spherical graphite was set to 15:85 (Comparative Example 2).

<Estimation of Amount of Amorphous Carbon for Covering>

The thermogravimetry (TG measurement) was performed on the carbon materials according to the above Examples and Comparative Examples in the atmosphere at a temperature increasing speed of 5° C./min using the differential scanning calorimeter TG8121 (Rigaku Corporation). The weight was plotted as the function of the temperature. The weight decrease ratio until the point where the temperature differential curve ΔTG of the weight change between 550° C. and 650° C. became the minimum was used as the amount of amorphous carbon for the covering.

<Fabrication of Negative Electrode>

As the negative electrode active material, each of the above carbon materials was used. Carbon black powder (hereinafter "CB") (Super-C65, manufactured by IMERYS GC) with a BET specific surface area of 62 $m^2/g$ as the conductive agent, and carboxymethyl cellulose (hereinafter "CMC") and styrene butadiene copolymer latex (hereinafter "SBR") as the binder resin were mixed in a solid content mass ratio of CB:CMC:SBR=0.3:1.0:2.0. The above carbon material and the obtained mixture were mixed at a ratio of 96.7:3.3. The resulting mixture was added to ion exchanged water and stirred, so that the materials were uniformly mixed and dispersed; thus, slurry was prepared. The obtained slurry was applied on a 10-μm-thick copper foil serving as the negative electrode current collector so that the dried slurry had a weight of 10 mg/$cm^2$ on each surface. Next, the electrode was heated at 100° C. for 10 minutes, so that water was evaporated. Thus, the negative electrode active material layer was formed. In addition, the electrode was pressed; thus, the negative electrode having the 67-μm-thick negative electrode active material layer applied on one surface of the negative electrode current collector was fabricated.

<Fabrication of Positive Electrode>

Lithium nickel composite oxide (lithium nickel cobalt manganese oxide ("NCM523", i.e., nickel:cobalt:manganese=5:2:3, lithium/metal (except lithium) ratio=1.04, BET specific surface area: 62 $m^2/g$)) with a mean particle diameter D50 of 9 μm and lithium manganese oxide (LiMn$_2$O$_4$) were mixed at a ratio of 75:25 and the mixed oxide was obtained. This mixed oxide was used as the positive electrode active material. CB (Super-C65, manufactured by IMERYS GC) with a BET specific surface area of 62 $m^2/g$ and graphite powder (hereinafter "GR") with a BET specific surface area of 22 m²/g which correspond to the conductive agent, and PVDF (#7200, Kureha Battery Materials Japan Co., Ltd.) which corresponds to the binder resin were mixed so that the solid content mass ratio was CB:GR:PVDF=3:1:3. The mixed oxide and the mixture containing CB, GR, and PVDF were mixed at a ratio of 93:7, and then added to NMP as the solvent. To this mixture, oxalic acid anhydrous (molecular weight: 90) as the organic moisture scavenger was added. The amount of added oxalic acid anhydrous was 0.03 parts by mass relative to 100 parts by mass of the solid content of the mixture excluding NMP. In addition, the mixture with oxalic acid anhydrous added was dispersed and mixed for 30 minutes by a planetary method. Thus, the slurry having the above materials uniformly dispersed was prepared. The obtained slurry was applied on a 20-µm-thick aluminum foil serving as the positive electrode current collector. Next, the electrode was heated at 125° C. for 10 minutes to evaporate NMP; thus, the positive electrode active material layer was formed. In addition, by pressing the electrode, the positive electrode with the 80-µm-thick positive electrode active material layer applied on one surface of the positive electrode current collector was fabricated.

<Separator>

A 25-µm-thick ceramic separator which contained polypropylene and a heat-resistant microparticle layer containing alumina as the heat-resistant microparticles was used.

<Electrolyte Solution>

Ethylene carbonate (EC), diethyl carbonate (DEC), and ethylmethyl carbonate (EMC) were mixed at a ratio of 30:60:10 (volume ratio). Into the obtained mixed nonaqueous solvent, lithium hexafluorophosphate ($LiPF_6$) as the electrolyte salt was dissolved so that the concentration thereof became 0.9 mol/L. To the obtained mixed nonaqueous solvent, MMDS, VC, and FEC as the additives were dissolved so that the total concentration thereof became 1 wt %; thus, this mixed nonaqueous solvent was used as the electrolyte solution.

<Fabrication of Lithium Ion Secondary Battery>

From each of the positive electrode plate and the negative electrode plate fabricated as above, rectangular members were cut into a predetermined size. On a part where coating was not applied for connecting a positive electrode terminal, a positive electrode lead terminal made of aluminum was welded with ultrasonic waves. Similarly, on a part where coating was not applied for connecting a negative electrode terminal, a negative electrode lead terminal made of nickel was welded with ultrasonic waves. The negative electrode plate and the positive electrode plate were disposed on both surfaces of the polypropylene porous separator in a state that both active material layers are overlapped on each other through the separator; thus, the electrode stack was obtained. This electrode stack was wrapped with two aluminum laminate films, and except one long side of the two aluminum laminate films, the other three sides were attached through heat-sealing. The electrolyte solution was poured into the laminated film package with a liquid amount of 140%, so that the pores of the electrode stack and the separator were impregnated with the electrolyte solution in vacuum. Next, the opening was heat-sealed under reduced pressure. Thus, a stacked lithium ion battery was obtained. After this stacked lithium ion battery was charged for the first time, aging was performed at 45° C. for several days. Thus, the fabrication of the stacked lithium ion secondary battery was completed.

<Peeling Strength>

The 90°-peeling strength was measured by the method substantially based on the testing methods of pressure-sensitive adhesive tapes and sheets (JISZ0237). A stainless-steel test piece and a copper foil side of each negative electrode with a width of 11 mm and a length of 10 cm were attached together with a double-sided tape. Next, a tape as the backing member was attached to the negative electrode active material layer side. Thus, a peeling strength test plate was formed. Each test plate was attached to the 90°-peeling test jig. One end of the test plate was attached to a load cell (ZTS-2N digital force gauge, IMADA CO., LTD.). With the use of a vertical motorized test stand (MX2-500N, IMADA CO., LTD.), the test plate was pulled up at an angle of 90° relative to the test plate at a speed of 5 mm/s. As a result, the peeling occurred between the copper foil and the negative electrode active material layer of the negative electrode. The peeling force for approximately 15 mm after the start of the pulling up of the test plate was ignored. After that, the average peeling force in the region where the values of the load cell became stable was used as the peeling strength between the copper foil and the negative electrode active material layer.

<Initial Charging-Discharging>

The initial charging-discharging was performed using the stacked lithium ion secondary battery fabricated as above. In the initial charging-discharging, constant-current and constant-voltage (CC-CV) charging was performed at an atmospheric temperature of 25° C. with a current of 10 mA and an upper-limit voltage of 4.2 V. After that, aging was performed at 45° C. for several days. Next, the constant-current discharging was performed with a current of 20 mA and an upper-limit voltage of 2.5 V.

<Cycle Characteristic Test>

A cycle characteristic test was performed on the stacked lithium ion secondary battery after the above initial charging-discharging. In this test, one charging-discharging cycle is carried out under the 25° C.-environment, and this test includes constant-current constant-voltage charging with a current of 100 mA, an upper-limit voltage of 4.15 V, and an ending current of 1 mA, and constant-current discharging with a current of 100 mA, ending at a lower-limit voltage of 2.5 V. This charging-discharging cycle was repeated 500 cycles (500 times). On this occasion, using the discharging capacity in the first cycle and the discharging capacity in the 500-th cycle obtained from the measurement, the retention (%) of the discharging capacity in the 500-th cycle relative to the discharging capacity in the first cycle (=the discharging capacity in the 500-th cycle/the discharging capacity in the first cycle) was calculated. The calculation result was used as the reference of the durability of the battery.

Table 1 shows the peeling strength of the negative electrodes according to Examples 1 to 5 and Comparative Examples 1 and 2 described above, and the cycle characteristic of the stacked lithium ion secondary batteries including those negative electrodes. Note that the cycle characteristic is the relative value when the cycle characteristic measured in Comparative Example 1 is 100.

TABLE 1

| | Pitch:graphite | Amorphous carbon coverage (%) | Peeling strength (mN/mm) | Cycle characteristic |
|---|---|---|---|---|
| Example 1 | 8:92 | 5 | 35 | 160 |
| Example 2 | 6:94 | 4 | 38 | 180 |

TABLE 1-continued

| | Pitch:graphite | Amorphous carbon coverage (%) | Peeling strength (mN/mm) | Cycle characteristic |
|---|---|---|---|---|
| Example 3 | 5:95 | 3 | 42 | 200 |
| Example 4 | 3:97 | 2 | 44 | 210 |
| Example 5 | 2:98 | 1 | 50 | 220 |
| Comparative Example 1 | 10:90 | 6 | 25 | 100 |
| Comparative Example 2 | 15:85 | 10 | 10 | 70 |

The negative electrode according to the present disclosure has the high peeling strength. In particular, the negative electrode with an amorphous carbon coverage of 1% (Example 5) has the remarkably improved peeling strength, and has the increased durability. The battery including this negative electrode has the excellent cycle characteristic and therefore, it is understood that by adjusting the amount of amorphous carbon that covers the negative electrode carbon material, the durability of the negative electrode and the lifetime of the battery itself can be improved. The battery including the negative electrode satisfying the range of the present disclosure has the high output and has the output capacity ratio suitable for the purpose as the on-vehicle battery.

Examples of the present disclosure have been described so far but Examples merely show examples of the embodiment of the present disclosure. Limiting the technical range of the present disclosure to the particular embodiment or the specific structure is not intended by Examples.

The negative electrode for a lithium ion secondary battery according to the embodiment of the present disclosure may be any one of the following first to third negative electrodes for a lithium ion secondary battery, and the lithium ion secondary battery according to the embodiment of the present disclosure may be the following first lithium ion secondary battery.

The first negative electrode for a lithium ion secondary battery is a negative electrode for a lithium ion secondary battery in which a negative electrode active material for a lithium ion secondary battery containing a carbon material and an aqueous binder is disposed on a negative electrode current collector. The carbon material is a graphite particle that has a covering layer containing amorphous carbon by 5% or less relative to the total weight of the carbon material.

The second negative electrode for a lithium ion secondary battery is the first negative electrode for a lithium ion secondary battery, in which the aqueous binder is selected from styrene butadiene rubber, carboxymethyl cellulose, and a mixture thereof.

The third negative electrode for a lithium ion secondary battery is the first or second negative electrode for a lithium ion secondary battery, in which the graphite is natural graphite.

The first lithium ion secondary battery is a lithium ion secondary battery including a power generating element including a positive electrode, a negative electrode, a separator, and an electrolyte solution inside a package. The negative electrode is any one of above-described first to third negative electrode for a lithium ion secondary battery.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A negative electrode for a lithium ion secondary battery, comprising:
   a negative electrode current collector; and
   a negative electrode active material for a lithium ion secondary battery, which is disposed on the negative electrode current collector and contains a carbon material, an aqueous binder, and a conductive agent,
   wherein the carbon material is a graphite particle having a covering layer containing amorphous carbon by 5 wt % or less relative to a total weight of the carbon material;
   wherein the graphite particle has an uneven and irregular surface;
   wherein the negative electrode active material has from 4 wt % to 7 wt % of the aqueous binder relative to the total weight of the negative electrode active material; and
   wherein is the only carbon particle in the carbon material is the graphite particle.

2. The negative electrode for a lithium ion secondary battery according to claim 1, wherein the aqueous binder comprises at least one material selected from styrene butadiene rubber, carboxymethyl cellulose, and a mixture thereof.

3. The negative electrode for a lithium ion secondary battery according to claim 1, wherein the graphite particle comprises a particle of natural graphite.

4. The negative electrode for a lithium ion secondary battery according to claim 1, wherein the aqueous binder comprises at least one material selected from a group consisting of butadiene rubber (BR), chloroprene rubber (CR), isoprene rubber (IR), and acrylonitrile butadiene rubber (NBR).

5. The negative electrode for a lithium ion secondary battery according to claim 1, wherein the aqueous binder comprises polyvinylidene fluoride (PVDF).

6. The negative electrode for a lithium ion secondary battery according to claim 1, wherein the aqueous binder comprises at least one material selected from a group consisting of xanthan gum, guar gum, and pectin.

7. The negative electrode for a lithium ion secondary battery according to claim 1, wherein the aqueous binder comprises polytetrafluoroethylene (PTFE) and/or polyvinyl fluoride (PVF).

8. The negative electrode for a lithium ion secondary battery according to claim 1, wherein the aqueous binder comprises at least one conductive polymer selected from the group consisting of polyanilines, polythiophenes, polyacetylenes, and polypyrroles.

9. The negative electrode for a lithium ion secondary battery according to claim 1, wherein the conductive agent is selected from the group consisting of carbon fiber, carbon black, activated carbon, mesoporous carbon, fullerenes, and carbon nanotube.

10. The negative electrode for a lithium ion secondary battery according to claim 1, further comprising at least one additive selected from the group consisting of thickener, dispersant, and stabilizer.

11. The negative electrode for a lithium ion secondary battery according to claim 1, wherein the graphite particle is in contact with an adjacent graphite particle at a plurality of points.

12. The negative electrode for a lithium ion secondary battery according to claim 1, wherein the carbon material consists of the graphite particle.

13. A lithium ion secondary battery comprising a power generating element inside a package, the power generating element comprising:
  a positive electrode;
  the negative electrode according to claim 1;
  a separator; and
  an electrolyte solution.

14. A negative electrode for a lithium ion secondary battery, comprising:
  a negative electrode current collector; and
  a negative electrode active material for a lithium ion secondary battery, which is disposed on the negative electrode current collector and contains a carbon material, an aqueous binder, and a conductive agent,
  wherein the carbon material is a graphite particle having a covering layer containing amorphous carbon by 5 wt % or less relative to a total weight of the carbon material;
  wherein the graphite particle is in contact with an adjacent graphite particle at a plurality of points;
  wherein the negative electrode active material has from 4 wt % to 7 wt % of the aqueous binder relative to the total weight of the negative electrode active material; and
  wherein is the only carbon particle in the carbon material is the graphite particle.

15. The negative electrode for a lithium ion secondary battery according to claim 14, wherein the aqueous binder comprises at least one material selected from styrene butadiene rubber, carboxymethyl cellulose, and a mixture thereof.

16. The negative electrode for a lithium ion secondary battery according to claim 14, wherein the graphite particle comprises is a particle of natural graphite.

17. The negative electrode for a lithium ion secondary battery according to claim 14, wherein the aqueous binder comprises at least one material selected from a group consisting of butadiene rubber (BR), chloroprene rubber (CR), isoprene rubber (IR), and acrylonitrile butadiene rubber (NBR).

18. The negative electrode for a lithium ion secondary battery according to claim 14, wherein the carbon material consists of the graphite particle.

19. A lithium ion secondary battery comprising a power generating element inside a package, the power generating element comprising:
  a positive electrode;
  the negative electrode according to claim 14;
  a separator; and
  an electrolyte solution.

20. A negative electrode for a lithium ion secondary battery, comprising:
  a negative electrode current collector; and
  a negative electrode active material for a lithium ion secondary battery, which is disposed on the negative electrode current collector and contains a carbon material, an aqueous binder, and a conductive agent,
  wherein the carbon material is a graphite particle having a covering layer containing amorphous carbon by 5 wt % or less relative to a total weight of the carbon material; and
  wherein the graphite particle has an uneven and irregular shape;
  wherein the negative electrode active material has from 4 wt % to 7 wt % of the aqueous binder relative to the total weight of the negative electrode active material; and
  wherein is the only carbon particle in the carbon material is the graphite particle.

21. The negative electrode for a lithium ion secondary battery according to claim 20, wherein the carbon material consists of the graphite particle.

* * * * *